United States Patent [19]

Berg

[11] 4,350,321

[45] Sep. 21, 1982

[54] QUICK COUPLING DEVICE FOR PRESSURIZED FLUID CONDUITS

[76] Inventor: Lennart G. Berg, Diagnosvägen 4 B, S-141 54 Huddinge, Sweden

[21] Appl. No.: 209,401
[22] PCT Filed: Feb. 6, 1980
[86] PCT No.: PCT/SE80/00037
§ 371 Date: Oct. 8, 1980
§ 102(e) Date: Sep. 25, 1980
[87] PCT Pub. No.: WO80/01711
PCT Pub. Date: Aug. 21, 1980

[30] Foreign Application Priority Data

Feb. 8, 1979 [SE] Sweden ............................ 7901115

[51] Int. Cl.³ .......................................... F16L 37/28
[52] U.S. Cl. ........................ 251/149.6; 137/614.03; 137/614.16; 285/316; 285/DIG. 25
[58] Field of Search ............... 137/614.01, 614.02, 137/614.03, 614.04, 614.05, 614.06, 614.16; 251/149.1, 149.4, 149.5, 149.6, 149.7, 149.8; 285/DIG. 25, 316

[56] References Cited

U.S. PATENT DOCUMENTS

| 1,580,694 | 4/1926 | Smith | 285/DIG. 25 |
|---|---|---|---|
| 2,471,237 | 5/1949 | Pasturczak | 137/614.03 |
| 2,689,138 | 9/1954 | Scheiwer | 137/614.03 |
| 2,727,759 | 12/1955 | Elliott | 251/149.6 |
| 3,466,054 | 9/1969 | Berg | 92/178 |
| 3,861,645 | 1/1975 | Norton | 251/149.6 |
| 4,077,433 | 3/1978 | Maldaus | 137/614.04 |

FOREIGN PATENT DOCUMENTS 366102 8/1974 Sweden.
1449258 9/1976 United Kingdom.

Primary Examiner—William R. Cline
Attorney, Agent, or Firm—Ostrolenk, Faber, Gerb & Soffen

[57] ABSTRACT

A coupling device including a casing part and a nipple part both provided with a flow-through channel. The nipple part is designed to be inserted into the flow-through channel of the casing part to open a spring-loaded shut off valve and thereby open a flow-through path through the coupling. The nipple part is designed to hold the valve and flow through path open and the two main parts connected to each other and is releasably engaged in a ball locking device or similar locking device in the casing part. The valve comprises two cooperating parts, both of which, under the influence of the nipple part, are axially movable in the channel both relative to each other and relative to the channel. One part of the valve is arranged inside a casing-shaped member which moves along a segment of the flow-through channel wall in the casing part to function as a slide valve relative to openings in the wall allowing flow communication through said coupling and allowing pressure evacuation of the interior of the flow-through channel.

14 Claims, 9 Drawing Figures

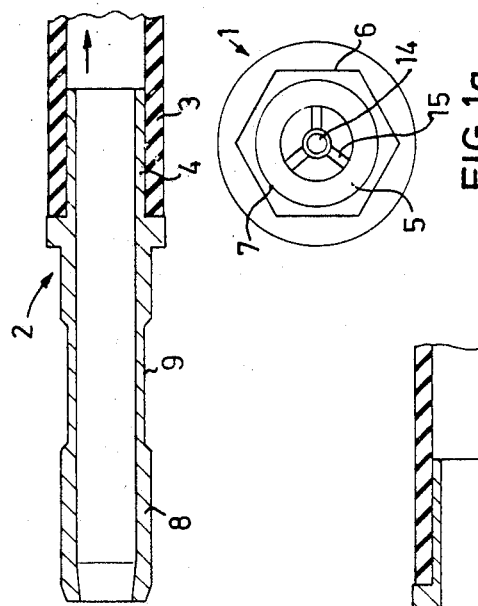
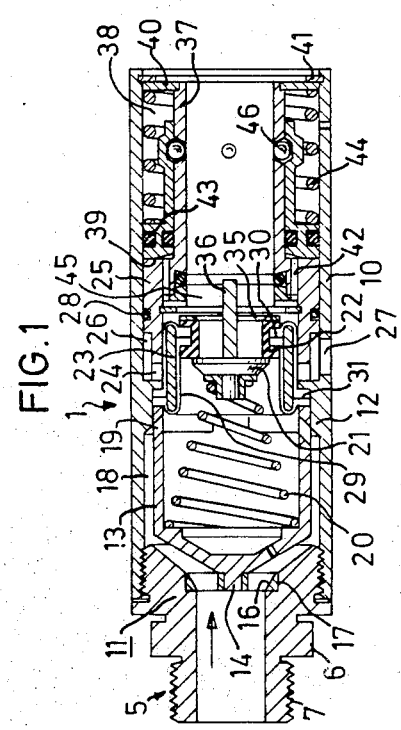
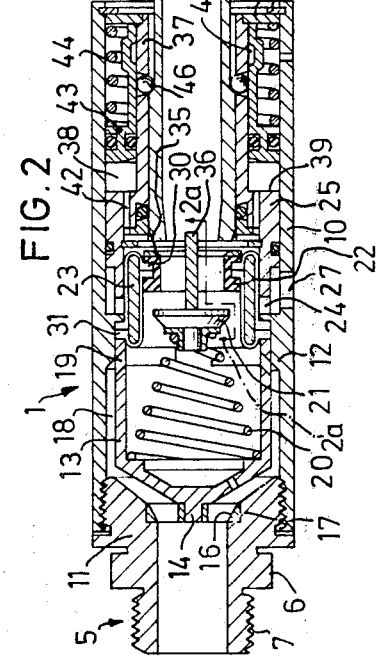
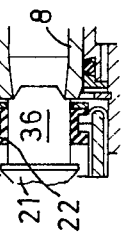

QUICK COUPLING DEVICE FOR PRESSURIZED FLUID CONDUITS

BACKGROUND OF THE INVENTION

In a majority of known coupling devices for pressurized fluid conduits, the conduits must first be depressurized before the interacting coupling members can be joined together or separated as a free outflow of medium under pressure always entails unnecessary waste and usually leads to complications in handling said coupling members. At high pressures, the risk for personal injury can also arise occasionally if the conduits are not depressurized. Furthermore, environmental damages can arise in the handling of liquid media.

Considerable risks for personal injury also exist for the known kind of so-called quick coupling intended for pressurized fluid conduits, said quick coupling comprising a casing part and a nipple part. Both are provided with a flow-through channel. The nipple part is designed to be inserted into the casing part flow-through channel in order to open a spring-loaded shut-off valve situated in the latter, thereby opening a flow-through path through the coupling and holding the valve and flow-through path open connecting the two parts to each other. For said latter purpose, the nipple part is releasably engaged in a ball locking device or similar locking device situated in the casing part. The shut-off valve situated inside the flow-through channel of the casing part comprises two interacting valve parts, both of which are axially movable relative each other and the channel under the influence of the nipple part. This is especially true when it comes to the separation of such quick coupling devices used in pressurized air conduits in which one or more hose sections are included and separation takes place without the conduit having been depressurized in advance. The brief thrust of pressure produced by the small amount of outflowing fluid has shown itself to be sufficient to occasionally cause such powerful tossing movements of the released hose ends that persons struck by said ends have even suffered disabling spinal damage.

SUMMARY OF THE INVENTION

Starting from the known type of quick coupling as described above, the purpose of the present invention is to propose a new and improved quick coupling in which the risk for powerful tossing movements of the separated conduit ends is eliminated. This is accomplished by means of one of the separated conduit ends having already been automatically depressurized when separation of the coupling has been initiated and while the interconnected casing and nipple parts of the coupling are still lockingly engaged in each other. The second conduit end is kept under maintained pressure but lacks flow-through connection with the depressurized end.

The purpose of the invention has been primarily achieved by means of one end of the shut-off valve being arranged inside an at least essentially casing-shaped member. This member can be moved along a segment of the wall of the flow-through channel in the casing part 1 in order to function as a slide valve relative to the flow-through openings in the wall. These openings lead to and from the channel segment. The openings leading to the segment are included in the flow-through channel through the coupling. The openings leading from the segment are connected to the immediate surroundings of the quick coupling for pressure evacuation of the interior of the flow-through channel in the casing part when the nipple part is disengaged from said casing part. The flow-through channel input end in the casing part is still under pressure. By means of the quick coupling according to the invention having such a design, a double valve function is obtained in the casing part of the coupling. This function makes it possible to automatically ensure that no tossing movements take place as a result of pressure thrusts arising during separation of the coupling. Furthermore, the coupling is simple from a production viewpoint and is simultaneously sturdy and reliable as regards use. Finally, the shut-off valve part can either be stationarily situated inside the casing-shaped member or also can be axially movable along the inside of the member.

In the first case, slide seals need only be arranged between the member or slide and the wall of the flow-through channel in the casing part. The seals can consist of normal annular rings or so-called rolling annular rings. The latter rings, due to their lesser friction, can contribute to making the slide valve designed as an at least essentially casing-shaped member more easily movable along the wall of the flow-through channel in the casing part of the coupling.

In the other case, however, sealing arrangements must exist between both the member and the flow-through channel wall as well as between the member and the one valve part. Despite this, however, the design of the casing-shaped member or slide valve according to the invention is advantageous. The sealing arrangements can be made very simple at the same time as both construction length and stroke length of the member/slide can be reduced. This reduces the construction length of the entire quick coupling as an advantageous result. This is especially true if the at least essentially casing-shaped member or slide valve has a number of features. The member or valve consists of a wide, rigid and essentially cylindrical ring totally surrounded by a casing of elastic material. The casing form the sealing arrangements of the casing-shaped member/slide. The casing is slidably arranged on the ring and has a radially-protecting flange running circumferentially about the ring on both the inner and outer sides of the ring so as to support said one part of the shut-off valve and for attachment of the casing-shaped member/slide in an annular groove in the wall of the flow-through channel in the casing part.

An especially simple and reliable construction is obtained in a quick coupling constructed according to the invention where there are openings which lead from the wall segment of the flow-through channel in the casing part. Along this segment the at least essentially casing-shaped member or slide can be moved. The openings communicate with the immediate surroundings of the quick coupling, in their open state resulting from the movement of the casing-shaped member/slide. The openings also communicate with a pressure chamber in the casing part. This chamber communicates with the flow-through channel. The chamber is situated after the shut-off valve in the flow direction through the casing part. A spring-loaded piston constitutes steering means for the ball locking device or similar locking device in the casing part and the piston is able to be moved under the influence of the pressure prevailing in the chamber.

BRIEF DESCRIPTION OF THE DRAWINGS

The invention shall be described in more detail in the following with reference being made to two embodiments of a quick coupling device constructed according to the same, said embodiments being illustrated in the accompanying drawings.

FIGS. 1-4 in the drawings show axial sections through a first embodiment of said quick coupling device in the separated, connected, commenced separation and almost completed separation states.

FIG. 1a shows an end view of said embodiment as seen from the left in FIG. 1 and FIG. 2a shows a detail section of the same along line 2a—2a in FIG. 2. Finally.

DESCRIPTION OF THE PREFERRED EMBODIMENTS

Figure 3:
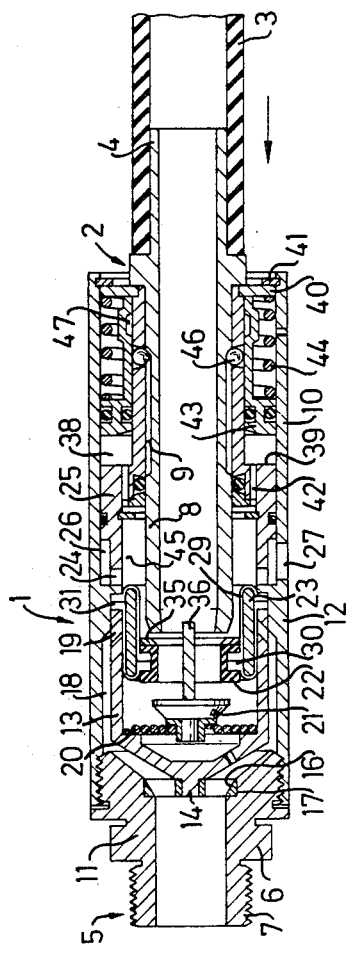
Figure 4:
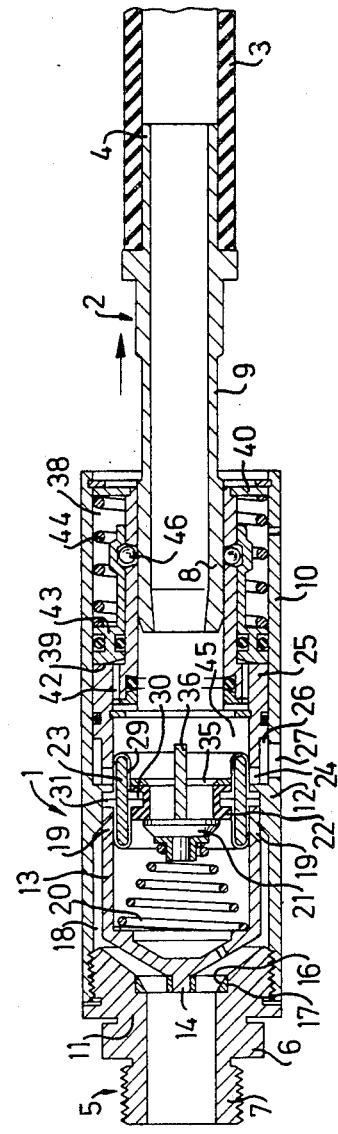

The drawings reveal that a quick coupling device for pressurized fluid conduits according to the present invention comprises two main parts, a casing part 1 and a nipple part 2. Both of these are provided with a flow-through channel. Furthermore, one set of ends of the two parts are provided with suitable arrangements for connection to a pressurized fluid conduit. The nipple part 2, for example, can be provided with an end part 4 designed to be inserted in a hose end 3, while the casing part 1 can be provided with a threaded end part 5 for connection to a tube end. In connection therewith, the casing part 1 should also be provided with a key grip 6 so as to expedite its tightening inside or onto a tube end. The end part 5 shown here is provided with an outer thread 7. One can also provide an end part having an inner thread for screwing onto the outer side of a threaded tube end. Naturally, the end part 5 can also be designed for hose connection.

Furthermore, the drawing reveals that the two main parts of a quick coupling device according to the invention are designed to be fit into each other. For this purpose, the front end 8 of the nipple part is provided with a design corresponding to the flow-through channel in the casing part 1. The front end 8 is also provided with a moderately elongated middle 9 intended to cooperate with a ball locking device situated inside the casing part 1. The ball locking device is described in more detail below.

The casing part 1 consists of an outer casing 10, into one end of which an end plug 11 is screwed. A bead 12 running around the circumference of the casing wall is situated a slight distance inside said outer casing. The bead constitutes a support for the inner end of a bell-shaped spring housing 13 inserted in the outer casing. The outer end of the spring housing is supported by a pin 14 attached to the housing end. The pin 14 is arranged in a support ring 16 provided with spokes 15. The ring 16 in turn is arranged in a turned cavity 17 around the inner end of the flow-through channel through the end plug 11 screwed into one end of the outer casing 10. The outer diameter of the bell-shaped spring housing 13 is smaller than the inner diameter of the outer casing 10 so that an annular channel 18 is created between the outer side of the spring housing and the inner side of the outer casing. By means of the open spaces between the spokes 15 of the support ring 16, the annular channel 18 communicates freely with the flow-through channel of the end plug 11 and thereby with the inside of the conduit into which the casing part 1 is screwed by means of its threaded end part 5. In order that the annular channel 18 shall be able to be included in the flow-through channel through the casing part 1, a ring of holes 19 is arranged in the wall of the bell-shaped spring housing 13 near the inner end of said channel. By means of the ring of holes, the interior of the spring housing 13 can be included as a part of the flow-through channel through the casing part 1. A conical spring 20 is drawn inside the bell-shaped spring housing 13. The wide end of the spring abuts a support surface on the inside of the closed spring housing end. The narrow end of the spring abuts a valve body 21 in the open end of the spring housing. The valve body can be moved towards and away from sealing abutment against a valve seat 22. Together with the conical spring 20, the valve body 21 and the valve seat 22 form a shut-off valve in the flow-through channel of the casing part 1, which valve makes it possible to open and close said flow-through channel.

According to the invention, both the valve seat 22 and the valve body 21 are, under the influence of the nipple part 2, axially movable in the flow-through channel both in relation to each other and to the channel. When the casing part 1 and nipple part 2 are coupled together, which is accomplished by means of the latter part being inserted into the former part, the nipple part 2 opens the shut-off valve consisting of the conical spring 20, the valve body 21 and the valve seat 22 and thereby opens a flow-through path through the coupling and also holds said valve and flow path open. The nipple part also holds together both of the main parts 1,2 of the quick coupling device, for which purpose the nipple part 2 is releasably engaged in the ball locking device or similar locking device in the casing part 1. The ball locking device shall be described in more detail below.

In order that both the valve body 21 and the valve seat 22 shall, through the influence of the front end 8 of the nipple part 2 be axially movable in the flow-through channel relative each other and said channel, the valve seat 22 which is suitably annular and consists of hard rubber (80-90 IRH) is arranged inside an at least essentially casing-shaped member 23 which can be moved along a segment of the wall of the flow-through channel in the casing part 1. According to the invention, the axially movable casing-shaped member 23 can hereby function as a slide valve relative to the flow-through openings in the wall segment, the openings leading to and from that valve. There are openings leading to segment the wall which consist of the holes 19 arranged in a ring around the inner end of the bell-shaped spring housing 13. The holes are included in the intended flow-through channel through the coupling. There are also openings leading from the wall segment to communicate with the immediate surroundings of the coupling. In the embodiments shown here, the latter openings consist of a number of radial grooves 24 in one end surface of a further casing 25 arranged in the inner casing 10. The end surface of the casing 25 provided with radial grooves abuts a stop surface on the bead 12 on the inside of the outer casing 10. Said casing 25 has an annular stop on its outer side near the end surface provided with radial grooves, whereby a ring channel 26 communicating openly with the radial grooves 24 is created between the inside of the outer casing 10 and the outer side of the further casing 25. By means of at least one hole 27 in the wall of the outer casing 10, the ring channel 26 communicates with the surroundings of the coupling. The further casing 25 has an annular groove on its outer side. In this groove, an annular ring 28 is arranged so as to function as a seal between the outer side of said casing and the inside of the outer casing.

The further casing 25 which is provided with a stop forming an outer ring channel and an end surface provided with radial grooves has such an inner diameter that its inner surface is radially aligned with the inner surface of the bell-shaped spring housing 13. Both inner surfaces, with their openings 19,24 leading to and from the flow-through channel through the coupling, form the channel wall segment along which the casing-shaped member 23 in which the shut-off valve is arranged to axially movable. The member 23 functions as a slide valve relative to said openings 19,24.

In the first embodiment shown in FIGS. 1-4, the seat 22 of the shut-off valve is axially movable along the inside of the essentially casing-shaped member of valve slide means 23 which, for this purpose, is provided with sealing arrangements both between itself and the wall of the flow-through channel and between itself and the valve seat 22. To be more exact, the casing-shaped member or slide means 23 consists of a wide, rigid and essentially cylindrical ring in the form of a steel ring or the like which is totally surrounded by a casing 29 of elastic material, for example, soft rubber (50–55 IRH). The casing forms the sealing arrangements of the casing-shaped member or slide means 23, and it can slide and has respective radially projecting flanges 30,31 extending circumferally around both of the inner and outer sides of the member/slide 23. The seat 22 of the shut-off valve is arranged on the casing flange 30 on the inside of the member/slide 23. For this purpose, the seat 22 has the form of a ring of hard rubber (80–90 IRH). The outside of the ring is provided with an annular groove having a cross section corresponding to that of the casing flange 30 so that the seat/ring 22 can be hung on the casing flange 30 with the help of said groove. The corresponding casing flange 31 on the outside of the member/slide 23 is, on the other hand, attached to an annular groove between the inner edge of the bell-shaped spring housing 13 and a stop on the annular bead 12 inside the valve slide means 23. The casing-shaped member or valve slide means 23, which in the embodiment of a quick coupling device according to the invention shown in FIGS. 1-4 supports the seat 22 of the shut-off valve, can advantageously consist of a radial sealing arrangement of the kind described in Swedish Pat. No. 366 102 or British Pat. No. 1 449 258 as such an arrangement consists of a rigid annular core surrounded by an elastic casing on which radial flanges exist on the inner and outer sides of said arrangement.

Figure 5:
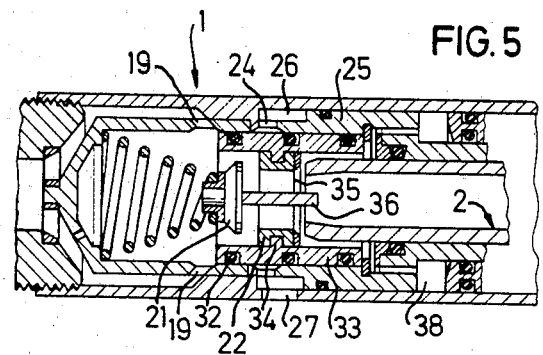
FIGS. 5-7 show an axial section through a second embodiment in the connected, commenced separation and almost completed separation states.
Figure 6:
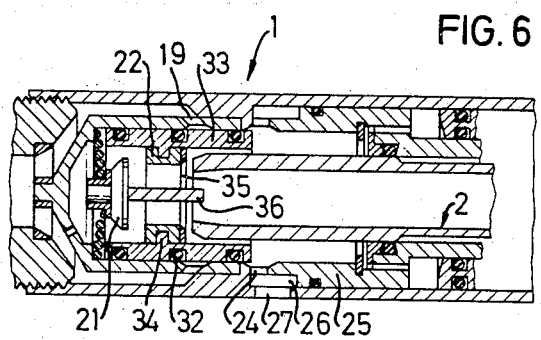
Figure 7:
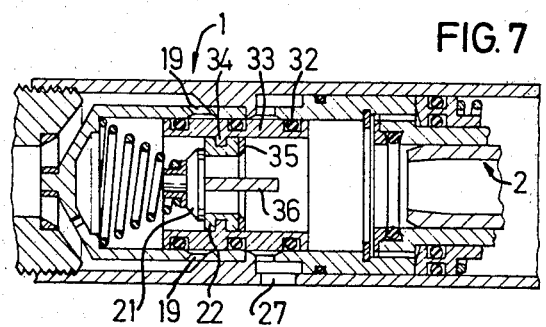

In the other embodiment of the quick coupling device shown in FIGS. 5-7, however, the shut-off valve seat 22 is not movable inside the casing-shaped member or valve slide means. Instead, said member or slide means consists of an elongated cylindrical casing 33 provided with annular rings 32 in annular grooves on its outer side. Inside the casing 33 the shut-off valve seat 22 is stationarily attached to a flange 34 projecting radially in from the casing wall. The annular rings 32 which are situated between the casing/slide means 33 and the flow-through channel wall in the casing part 1 can consist of the "rolling" annular rings described in U.S. Pat. No. 3,466,054.

In both of the embodiments described here, the shut-off valve seat 22 consists of a hard rubber ring. The side of the ring which is facing away from the spring-loaded valve body 21 is provided with a metal lining 35 which can, for example, consist of an annular steel washer. The inner edge of the lining 35 is beveled so that it constitutes a stop surface for the front end 8 of the nipple part 2 which can be inserted into the flow-through channel in the casing part 1.

In order that the front end 8 of the nipple part will be able to move the spring-loaded valve body 21 as well as the valve seat 22, the valve body is, in both of the embodiments shown here, provided with a blade-shaped stop 36 projecting axially towards the nipple part, said stop being sufficiently long to always extend across the out through the rear side of the annular member forming the seat of the shut-off valve 22 no matter which positions the valve body and valve seat assume relative to each other. The free end of the stop 36, which also serves as a guide for the movements of the valve body 21 (see FIG. 2a), is designed to cooperate with the front end 8 of the nipple part 2 which can be inserted into the flow-through channel in the casing part 1.

The further casing 25, towards whose inner surface the casing-shaped member or valve slide means 23 can be moved has a tubular axial extension 37 on its end facing the nipple part 2. The extension 37 has a smaller outer and inner diameter than the rest of the casing 25. In this manner, an annular space 38 is created between the outer side of the axial extension 37 and the inside of the outer casing 10. The inner axial end of the space 38 is restricted by a radial step 39 in the further casing 25 and the outer axial end is restricted by an annular plate 40 which uncovers the space 38 in the outward direction and is held in place between the outer edge of the axial extension 37 and a locking ring 41 arranged in an annular groove in the inner side of the outer casing. The space 38 communicates with the flow-through channel through the casing part 1 via conduits 42 in the step 39 in the further casing 25. The conduits open into a central segment 45 of the flow-through channel in the casing part 1. A pneumatic piston 43 loaded by a helically coiled spring 44 is arranged inside the space 38. Both radial sides of the spring-loaded pneumatic piston 43 are sealed by means of annular rings against the walls of the space 38 so that it can move reciprocally in said space as the pressure therein varies as a result of the communication of the space 38 with the central section of the flow-through channel via the conduits 42. The pressure-influenced, spring-loaded piston 43 in the space 38 is included in the ball locking device of the quick coupling. For this purpose, a number of locking balls 46 are arranged in conical holes in the wall of the extension between the inside of the piston and the tubular axial extension 37 of the further casing 25. During the reciprocal movement of the piston 43 in the space 38 as a result of the pressure prevailing in the space, the balls 46 are moved into and out of the conical holes through the wall of the tubular axial extension 37 so as to engage with and disengage from the middle 9 on the front end 8 of the nipple part 2 and lock or release the nipple part 2 in the flow-through channel in the casing part 1.

As the annular space 38 which constitutes the pressure cylinder for the spring-loaded, locking ball-controlled piston 43 communicates with the central section 45 of the flow-through channel in the casing part 1, it can also communicate with the immediate surroundings of the casing part by means of the openings 24 leading to the casing, the annular conduit 26 and the holes 27 in the outer casing 10, as all of these connect the central section 45 of the flow-through channel with the immediate surroundings of the casing. This connection takes place when the openings 24 leading from the central section are uncovered as a result of the movement of the casing-shaped member or valve slide means 23 inside the casing part 1 when the nipple part 2 is inserted further into the casing part when the two main parts of the quick coupling device are separated from each other.

The open state of the openings 24 results from the movement of the casing-shaped member/slide means 23. The openings 24 leading from the wall segment of the flow-through channel in the casing part 1, along which the casing-shaped member or valve slide organ 23 can be moved. The openings communicating with the immediate surroundings of the quick coupling device and also communicate with the pressure chamber or pressure space 38 in the casing part. The chamber 38 communicates with the flow-through channel and is situated in the flow direction through the casing part 1 after the shut-off valve. In the chamber 38, the spring-loaded pneumatic piston 43 is movable under the influence of pressure prevailing in the chamber or space in question. The piston 43 constitutes steering means for the balls 46 situated in the casing part 1. The balls are included in the locking device of the quick coupling according to the invention.

The function of the coupling according to the invention shall now be described with reference to the first embodiment shown in FIGS. 1-4. FIG. 1 shows the coupling with both of its two main parts 1,2 separated from each other. As a result of the conical spring 20 inside the spring housing 13 and the pressure prevailing in the housing, the valve body 21 abuts the valve seat 22 so that it seals against it. As a result of the pressure and the spring 20, the slidable casing or valve slide 23 supporting the valve seat 22 in the flow-through channel simultaneously has such a position that it closes the outlet openings 24 in the flow-through channel wall segment leading to the surroundings of the coupling device.

FIG. 2 shows the nipple part 2 inserted into the casing part 1 in which the nipple part is held by means of the balls 46 included in the casing part ball locking device. In this state, the shut-off valve consisting of the valve body 21 and the valve seat 22 is completely open as the nipple part presses against the valve body stop 36 so that the flow-through channel through the coupling is completely free. The casing-shaped member or valve slide means 23 supporting the valve seat 21 is still in the same position as when the shut-off valve is closed and the two main parts of the quick coupling device are still separated from each other.

FIG. 3 shows the subsequent uncoupling of the nipple part 2 from the casing part 1. As the Figure reveals, the nipple part is moved further into the casing part. The front end of the nipple part, while abuting both the valve body 21 stop 36 and the stop 35 on the ring forming the valve seat 22, will also move the casing-shaped member 23 further into the casing part so that the valve slide means will close the openings 19 leading to the flow-through channel and simultaneously uncover the openings 24 through which the central segment 45 of the channel communicates with the immediate surroundings of the coupling via the annular conduit 26 and the holes 27 in the outer casing 10. The inner part of the space 38 in which the pneumatic piston 43 steering the locking balls 46 is active is thereby depressurized as a result of its communication via the conduits 42 with the central segment 45 of the flow-through channel and further out to the immediate surroundings of the casing part 1. As a result of the spring load thereon, the piston 43 will then be moved to the left in FIG. 3 so that the locking balls 46 can disengage from the middle 9 of the nipple part and instead enter an annular groove 47 in the piston 43. The nipple part 2 can then be pulled out of the casing part 1 in the manner revealed in FIG. 4. The conical spring 20 will thereby no longer be hindered by the front end of the nipple part and be able to press the valve body 21 into sealing abutment against the valve seat 22 at the same time as the spring force also moves the casing-shaped member or valve slide means 23 to the right in FIG. 4 so that while it moves along the channel wall, it simultaneously covers all of the openings leading to and from the channel wall segment in question and the nipple can be pulled out of the now totally depressurized insertion end of the casing part 1. Under the influence of the conical spring 20, the member or valve slide means 23 supporting the valve seat will be moved further to the right so as to finally assume the position revealed in FIG. 1 and in which the openings 19 in the spring housing 13 are exposed so that the shut-off valve formed by the valve body 21 and valve seat 2 will now hold the flow-through channel in the casing part 1 closed.

The invention is not restricted to the two embodiments described here and shown in the drawings. Rather, it can be modified in many ways within the framework of the claims.

I claim:

1. A quick coupling device for a pressurized fluid conduit, said coupling device comprising a casing part and a nipple part, each part having a flow-through channel and the parts being assembled endwise to define a continuous flow channel; the nipple part having a front portion for being inserted into the casing part and the casing part having an open rear portion for receiving the inserted nipple part;

a flow channel blocking valve in the casing part, the valve including a valve seat supported in the casing part, and the valve seat being movable along the flow channel; a valve element movable along the flow channel and movable from seating on the valve seat, where the valve element and valve seat cooperate to block the flow channel, in a direction off the valve seat and away from the nipple part to open the flow channel, and a spring loading the valve element to seat on the valve seat;

a casing member extending around the valve seat; the casing member being movable along the flow channel and the flow-through channel in the casing part including an internal channel wall of the casing part which is engaged by the casing member for that member to serve as a slide valve on the channel wall;

a first opening through the channel wall and communicating from the fluid conduit into the flow channel in the casing part at the side of the valve that is further away from the nipple part;

a second opening through the channel wall and also communicating into the flow channel in the casing part at the side of the valve further toward the nipple part; the second opening also communicating to the exterior of the casing part, thereby enabling pressure evacuation of the flow channel at that side of the valve that is further toward the nipple part;

the first and second openings being so placed along the channel wall and the casing member being of such length along the channel wall that the casing member may selectively block either one or both of the first and second openings at various positions of the casing member along the channel wall;

the front portion of the nipple part being so shaped and the valve seat and valve element also being respectively so shaped and positioned that, upon insertion of the front part of the nipple part into the casing part, the front part of the nipple part eventually engages both the valve element and the valve seat for moving the valve element off the valve seat and for moving the valve seat along the flow channel between the positions thereof; the nipple part also engaging the casing member upon insertion of the nipple part into the casing part for moving the casing member among its positions along the channel wall.

2. The quick coupling device of claim 1, further comprising locking means in the casing part for releasably locking the nipple part inserted into the casing part.

3. The quick coupling device according to claim 1, wherein the first and second openings are so positioned and the casing member is so shaped and positioned that:

with the nipple part separated from the casing part, the valve element is biased by the spring against the valve seat and the casing member is in position to block the second opening and open the first opening;

with the nipple part front portion inserted a first distance into the casing part, the nipple part contacts and urges the valve element off the valve seat, while the casing member still blocks the second opening and opens the first opening, whereby there is a complete flow channel from the pressure conduit, through the first opening, into the casing part, past the valve, and through the nipple part;

with the nipple part front portion inserted a further distance into the casing part, the nipple part contacts and urges the valve element off the valve seat and also urges the casing member to shift to open the second opening while blocking the first opening, whereby the flow channel in the portion of the casing part in which the nipple part is positioned may be vented while the casing member prevents venting of the pressure conduit through the first opening communicating through the flow channel with the second opening;

with the nipple part subsequently being removed from the casing part, the valve element seats against the valve seat and the casing member shifts to block both of the first and second openings.

4. The quick coupling device of claim 3, further comprising locking means in the casing part for releasably locking the nipple part inserted into the casing part.

5. The quick coupling device of either of claims 1 or 4, wherein the locking means comprises a pressure chamber in the casing part and the pressure chamber also communicating with the flow channel to the side of the valve seat toward the nipple part;

a piston in the pressure chamber for being driven to a locking position when the pressure chamber is pressurized and to an unlocking position when the pressure chamber is not pressurized; a locking element which is driven by the piston to block removal of the nipple part from the casing part when the piston is in the locking position and to permit removal of the nipple part from the casing part when the piston is in the unlocking position.

6. The quick coupling device of claim 5, wherein the locking element comprises a detent element biased radially inwardly toward the nipple part when the piston is in the locking position.

7. The quick coupling device of claim 1, wherein the valve seat is stationary within and moves together with the casing member.

8. The quick coupling device of claim 7, further comprising seals between the casing member and the channel wall.

9. The quick coupling device of claim 8, wherein the seals comprise annular rings around the casing member.

10. The quick coupling device of claim 9, wherein the annular rings are comprised of rolling annular rings.

11. The quick coupling device of either of claims 1 or 3, wherein the valve seat is movable along the flow channel inside of and with respect to the casing member and the valve seat is so connected with the casing member that movement of the valve seat along the flow channel moves the casing member along the channel wall.

12. The quick coupling device of claim 11, further comprising sealing connections between the casing member and the valve seat, and between the casing member and the channel wall.

13. The quick coupling device of claim 12, wherein the casing member is comprised of a wide, rigid and essentially cylindrical ring and a separate case surrounding the ring, the separate case being comprised of elastic material; the case forming a seal between the casing member and the channel wall, on the one hand, and between the casing member and the valve seat, on the other hand, and the case being slidable on the ring as the casing member is moved axially along the channel wall.

14. The quick coupling device of claim 13, wherein the surrounding case has a first radially projecting flange running peripherally around the radial exterior of the ring to attach the surrounding case at the channel wall in the casing part and has a second radially projecting flange running peripherally around the radial interior of the ring for engaging the valve seat whereby the valve seat and the second flange may move together as a unit.

* * * * *